(12) United States Patent
Kuai

(10) Patent No.: US 9,991,820 B2
(45) Date of Patent: Jun. 5, 2018

(54) MULTI-LEVEL CONVERTER AND METHOD OF OPERATING SAME

(71) Applicant: Caterpillar Inc., Peoria, IL (US)

(72) Inventor: Yingying Kuai, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 204 days.

(21) Appl. No.: 15/061,591

(22) Filed: Mar. 4, 2016

(65) Prior Publication Data

US 2017/0256950 A1 Sep. 7, 2017

(51) Int. Cl.
  *H02M 7/5387* (2007.01)
  *H02M 7/483* (2007.01)

(52) U.S. Cl.
  CPC ......... *H02M 7/5387* (2013.01); *H02M 7/483* (2013.01); *H02M 2007/4835* (2013.01)

(58) Field of Classification Search
  CPC ........ H02M 1/4266; H02M 1/14; H02M 1/12; H02M 7/5395; H02M 5/45; H02M 5/451; H02M 5/458; H02M 7/521; H02M 7/5387; H02M 7/53871; H02M 7/53875; H02M 3/3155; H02M 3/325; H02M 3/335; H02M 7/537; H02M 7/5383
  See application file for complete search history.

(56) References Cited

U.S. PATENT DOCUMENTS

| | | | |
|---|---|---|---|
| 8,885,374 B2 | 11/2014 | Zhang et al. | |
| 9,083,230 B2 | 7/2015 | Narimani et al. | |
| 9,142,956 B2* | 9/2015 | Yatsu | H02J 1/00 |
| 9,143,054 B2 | 9/2015 | Kuwahara | |
| 2013/0258728 A1* | 10/2013 | Takizawa | H02H 7/1203 363/50 |
| 2013/0314957 A1 | 11/2013 | Gupta et al. | |
| 2014/0169040 A1* | 6/2014 | Schroeder | H02M 3/33507 363/21.01 |
| 2014/0293667 A1 | 10/2014 | Schroeder et al. | |
| 2015/0200602 A1* | 7/2015 | Narimani | H02M 5/4585 363/37 |
| 2015/0311776 A1* | 10/2015 | Lavieville | H02M 7/487 363/65 |

FOREIGN PATENT DOCUMENTS

EP 2110939 A1 10/2009

* cited by examiner

*Primary Examiner* — Nguyen Tran
(74) *Attorney, Agent, or Firm* — Miller, Matthias & Hull

(57) ABSTRACT

A multi-level converter is provided. The multi-level converter may include a plurality of direct current (DC) sources coupled in series to form a DC link, and at least one phase circuit coupled in parallel to the DC link. The phase circuit may include at least one flying capacitor, at least one output node, a first set of switching devices selectively coupling the flying capacitor to one or more of the DC sources at a first frequency, and a second set of switching devices selectively coupling the flying capacitor to the output node at a second frequency.

19 Claims, 8 Drawing Sheets

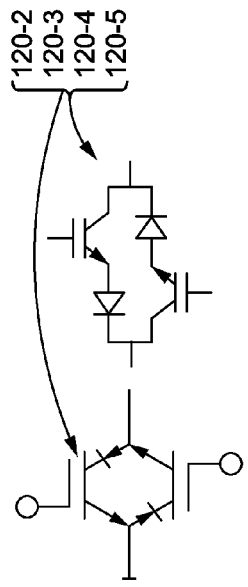
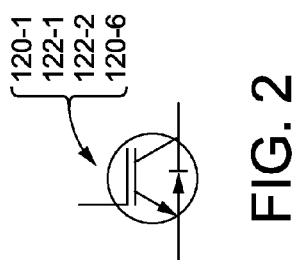
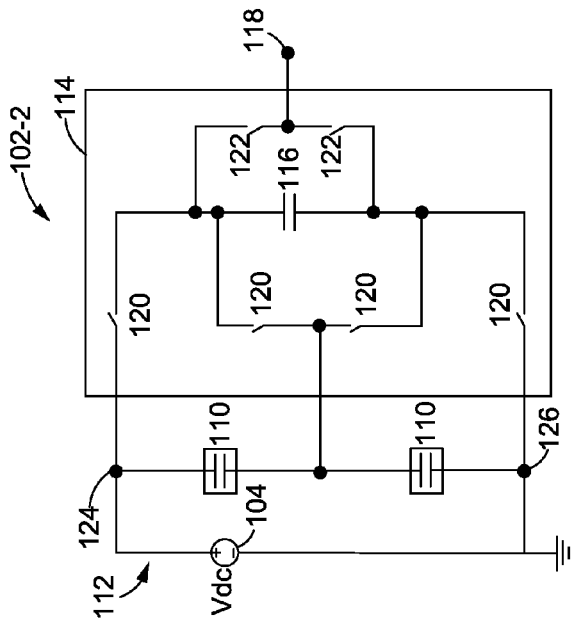
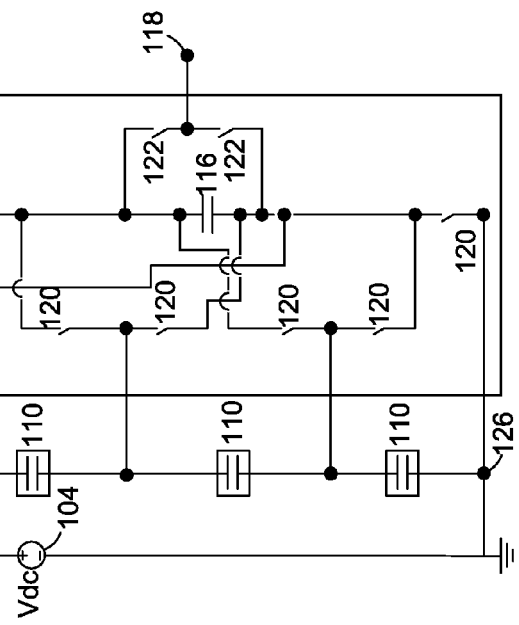

MULTI-LEVEL CONVERTER AND METHOD OF OPERATING SAME

TECHNICAL FIELD

The present disclosure relates generally to power converters, and more particularly, to multi-level converter topologies and methods for operating same.

BACKGROUND

Converters or inverters are commonly used to convert one form of electrical power, such as direct current (DC) power, into another form of electrical power, such as alternating current (AC) power, or vice versa. A multi-level converter is a type of converter that is usually favored over conventional or two-level converters for applications with larger load demands due to the improved power quality, reduced common-mode voltages, higher power densities and lower costs associated therewith. In general, multi-level converters employ switches and corresponding circuitry that couple to a plurality of DC capacitors and/or other DC sources in a coordinated manner that is configured to modulate pulse widths at different DC voltage ranges or levels according to a reference sinusoidal waveform, and ultimately generate the desired AC phase signals.

With the added benefits of multi-level converters, however, also comes increased complexity. More particularly, conventional multi-level converters employ a large number of switches which are switched at high frequencies. For example, a neutral point clamped (NPC) converter implementing a seven-level topology uses a total of thirty-six active switches all operating at high switching frequencies. In another example, U.S. Pat. No. 8,885,374 ("Zhang") discloses a five-level converter with three DC capacitors and three connected phases, where each phase has one flying capacitor and eight switches, or a total of twenty-four switches. Notably, a seven-level converter based on Zhang's topology would employ as many switches as those in the comparable to seven-level NPC converter above, all actively operating at high frequencies.

Due to the complexity of the circuitry and the number of active switches required, conventional multi-level converters cost more to implement and maintain, and might suffer lowered efficiency due to extra switching losses. Reducing the number of switches and/or reducing the switching frequencies of the switches would be beneficial in several ways. Specifically, reducing the number of switches needed and/or the frequency of switching performed not only reduces the costs of implementing and/or maintaining the multi-level converter, but also generates less heat and thereby prolongs the life of the multi-level converter. Furthermore, reducing the operating temperature of a multi-level converter also reduces the amount of cooling solutions needed in support thereof.

In view of the foregoing disadvantages associated with conventional multi-level converters, a need therefore exists for more cost-effective, simplified and yet reliable solutions that do not adversely affect performance or power output quality. Accordingly, the present disclosure is directed at addressing one or more of the deficiencies and disadvantages set forth above. However, it should be appreciated that the solution of any particular problem is not a limitation on the scope of this disclosure or of the attached claims except to the extent expressly noted.

SUMMARY OF THE DISCLOSURE

In one aspect of the present disclosure, a multi-level converter is provided. The multi-level converter may include a plurality of direct current (DC) sources coupled in series to form a DC link, and at least one phase circuit coupled in parallel to the DC link. The phase circuit may include at least one flying capacitor, at least one output node, a first set of switching devices selectively coupling the flying capacitor to one or more of the DC sources at a first frequency, and a second set of switching devices selectively coupling the flying capacitor to the output node at a second frequency.

In another aspect of the present disclosure, a multi-level converter system is provided. The multi-level converter system may include a plurality of DC sources forming a DC link, at least one phase circuit coupled in parallel to the DC link, and a controller in electrical communication with at least each of the first set of switching devices and the second set of switching devices of the phase circuit. The phase circuit may include at least one flying capacitor, at least one output node, a first set of switching devices disposed between the flying capacitor and one or more of the DC sources, and a second set of switching devices disposed between the flying capacitor and the output node. The controller may be configured to selectively enable the first set of switching devices based on a first set of gating signals at a first frequency, selectively enable the second set of switching devices based on a second set of gating signals at a second frequency, and generate a phase signal at the output node.

In yet another aspect of the present disclosure, a method of controlling a multi-level converter having a plurality of DC sources and at least one phase circuit having a flying capacitor and an output node is provided. The method may include generating a first set of gating signals at a first frequency based on a reference signal and a plurality of carrier signals, generating a second set of gating signals at a second frequency, selectively enabling a first set of switching devices disposed between the flying capacitor and one or more of the DC sources based on the first set of gating signals, selectively enabling a second set of switching devices disposed between the flying capacitor and the output node based on the second set of gating signals, and generating a phase signal at the output node.

These and other aspects and features will be more readily understood when reading the following detailed description in conjunction with the accompanying drawings.

BRIEF DESCRIPTION OF THE DRAWINGS

FIG. 2 is a schematic illustration of a forward-blocking, bidirectionally-conducting switch;

FIG. 3 is a schematic illustration of a bidirectionally-blocking, bidirectionally-conducting switch;

FIG. 4 is a schematic illustration of a nine-level converter system constructed in accordance with the teachings of the present disclosure;

FIG. 5 is a schematic illustration of a five-level converter system constructed in accordance with the teachings of the present disclosure;

While the following detailed description is given with respect to certain illustrative embodiments, it is to be understood that such embodiments are not to be construed as limiting, but rather the present disclosure is entitled to a scope of protection consistent with all embodiments, modifications, alternative constructions, and equivalents thereto.

DETAILED DESCRIPTION

Figure 1:
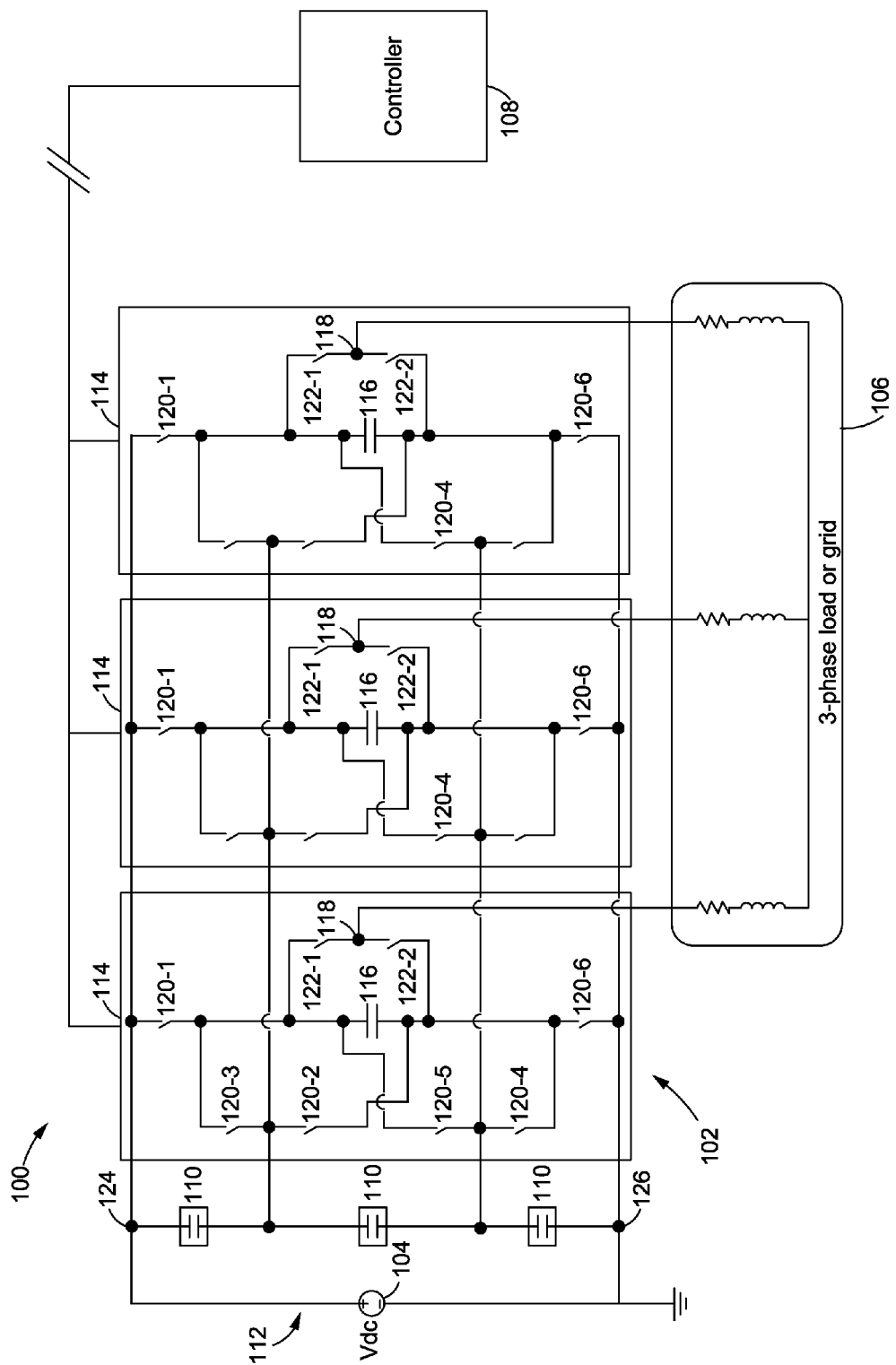
FIG. 1 is a schematic illustration of an exemplary embodiment of a multi-level converter system constructed in accordance with the teachings of the present disclosure.

Referring now to FIG. 1, one exemplary embodiment of a multi-level converter system 100 is provided. As shown, the multi-level converter system 100 may generally include a multi-level converter 102 that is coupled between a direct current (DC) voltage source 104 and an alternating current (AC) load 106, and a controller 108 configured to control the multi-level converter 102. More specifically, the multi-level converter 102 may include a plurality of DC sources 110 coupled in series to form a DC link 112 thereacross, and one or more phase circuits 114, each coupled in parallel to the DC link 112. Although shown with three capacitors, the DC sources 110 may alternatively employ any combination of batteries, photovoltaic cells or panels, regulated rectifier outputs, regulated DC converter outputs, and any other suitable DC source. Also, while the multi-level converter 102 is a three-phase seven-level converter with three phase circuits 114 for connection to a three-phase grid or load 106, converters other than seven-level converters, multi-level converters other than three-phase converters, and other variations from the multi-level converter 102 of FIG. 1 are possible and will be apparent to those of ordinary skill in the art.

As shown in FIG. 1, each of the phase circuits 114 may include at least one flying capacitor 116, at least one output node 118, a first set of switching devices 120 selectively coupling the flying capacitor 116 to one or more of the DC sources 110, and a second set of switching devices 122 selectively coupling the flying capacitor 116 to the output node 118. In particular, the first set of switching devices 120 may include at least a first switching device, such as the uppermost switching device 120-1 coupled to the positive terminal 124 of the DC link 112, a second switching device, such as the lowermost switching device 120-6 coupled to the ground terminal 126 of the DC link 112, and one or more intermediate switching devices 120-2, 120-3, 120-4, 120-5 disposed therebetween. As shown, the first set of switching devices 120 may include six switching devices per phase, while the second set of switching devices 122 may include two switching devices per phase.

With reference to FIG. 1, each of the first switching device 120-1 and the second switching device 120-6, as well as each of the second set of switching devices 122-1, 122-2 may employ forward-blocking, bidirectionally-conducting switches as shown for example in FIG. 2, while each of the intermediate switching devices 120-2, 120-3, 120-4, 120-5 may employ bidirectionally-blocking, bidirectionally-conducting switches as shown for example in FIG. 3. Moreover, based on the topology provided, one or more of the first set of switching devices 120 may be enabled at a switching frequency that is significantly less than the switching frequency of the second set of switching devices 122 as demonstrated further below. Additionally, as compared with conventional multi-level converters, the multi-level converter 102 of FIG. 1 may provide comparable phase output signals using fewer switching devices 120, 122 per phase and/or significantly lower switching operations per phase.

Converters other than the seven-level converter 102 of FIG. 1 may be constructed while retaining the general topology of the present disclosure as well as the advantages thereof. More specifically, an n-level converter may be implemented by providing a DC link 112 with (n−1)/2 DC capacitors 110, a first set of switching devices 120 with n−1 switching devices per phase, and a second set of switching devices 122 with two switching devices per phase. Based on such guidelines, the nine-level converter 102-1 of FIG. 4 for example may be provided with four series-connected DC capacitors 110, a first set of switching devices 120 with eight switching devices per phase, and a second set of switching devices 122 with two switching devices per phase. Similarly, the five-level converter 102-2 of FIG. 5 may be provided with two series-connected DC capacitors 110, a first set of switching devices 120 with four switching devices per phase, and a second set of switching devices 122 with two switching devices per phase.

Referring again to the multi-level converter system 100 of FIG. 1, the controller 108 may be implemented using one or more of a processor, a microprocessor, a microcontroller, a digital signal processor (DSP), a field-programmable gate array (FPGA), or any other suitable means for electronically controlling the switching devices 120, 122 of each of the phase circuits 114 of the multi-level converter 102. Moreover, the controller 108 may be configured to operate according to predetermined algorithms or sets of instructions for enabling the switching devices 120, 122 in a manner configured to convert the DC voltage provided via the DC link 112 into the appropriate AC signals at the output nodes 118 for use by the connected load 106. One exemplary embodiment of the controller 108 implemented in the form of a logic circuit for controlling one phase circuit 114 is provided in FIG. 6. Although shown as a logic circuit, other comparable techniques or schemes for implementing the controller 108 and performing the functions thereof will be apparent to those of ordinary skill in the art.

Figure 6:
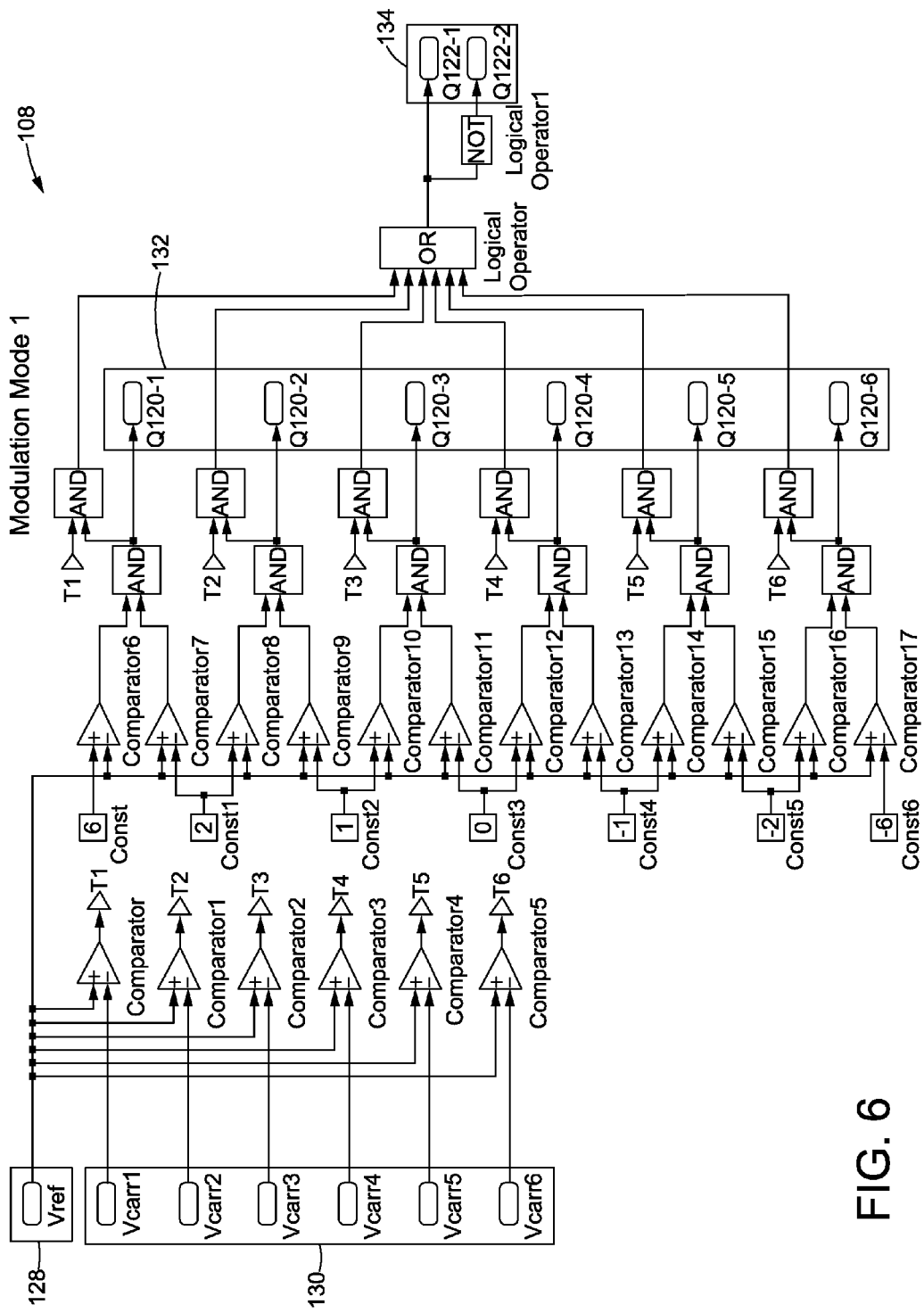
FIG. 6 is a schematic illustration of a controller for a multi-level converter configured to operate according to a first modulation mode.
Figure 7:
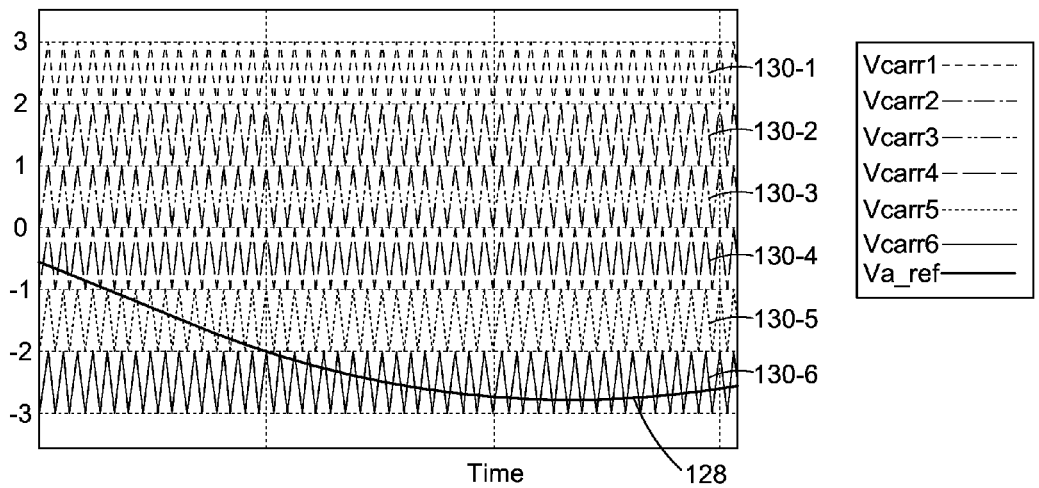
FIG. 7 is a graphical illustration of a reference signal and carrier signals.
Figure 8:
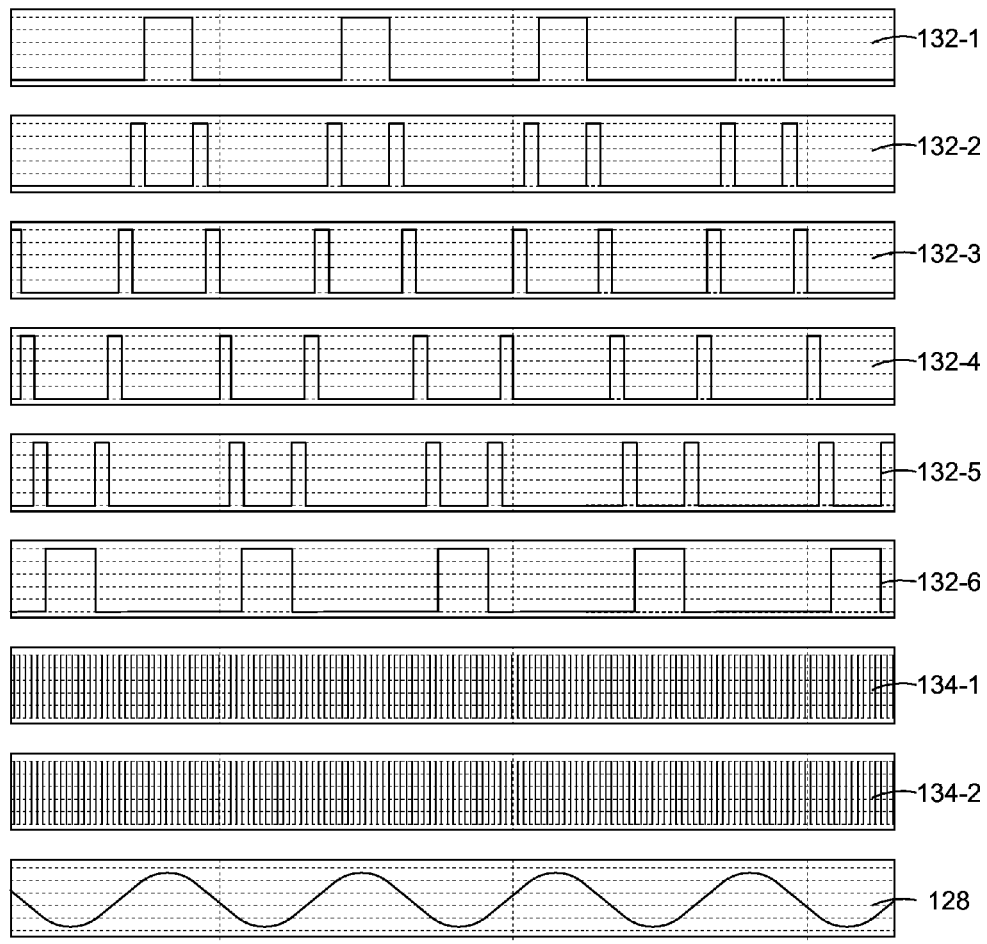
FIG. 8 is a graphical illustration of gating signals and a reference signal.

In general, the controller 108 of FIG. 6 may be configured to receive or generate a reference signal 128 and one or more carrier signals 130, and output a first set of gating signals 132 for enabling the first set of switching devices 120 and a second set of gating signals 134 for enabling the second set of switching devices 122 of each phase circuit 114. The reference signal 128 may include a sinusoidal waveform as shown in FIGS. 7 and 8, or any other suitable signal by which pulse width modulation may be performed, and have a frequency approximate to that of the desired AC output. The carrier signals 130 may include triangular waveforms each being tiered at distinct voltage tiers as shown in FIG. 7. For the seven-level converter 102 of FIG. 1 for example, the carrier signals 130 may include six triangular waveforms tiered into seven different voltage levels as shown in FIG. 7. As shown in FIG. 6, the controller 108 may be configured to compare the reference signal 128 to each of the carrier signals 130 using one or more sets of logic gates or circuitry to ultimately arrive at or generate the first set of gating signals 132 and the second set of gating signals 134.

As further demonstrated in FIG. 8, the controller 108 may perform logic operations on the reference signal 128 and the carrier signals 130, as shown for instance in FIG. 7, in a manner which produces gating signals 132, 134 that collectively reduce unnecessary switching operations, and thereby reduce operating temperatures and prolong the life of the multi-level converter 102. In particular, the first set of gating signals 132 may be configured to enable one or more of the first set of switching devices 120 at a frequency that is significantly less than the switching frequency of the second set of gating signals 134. In FIG. 8 for example, each of the first set of switching devices 120 is operated at approximately 120 Hz, while each of the second set of switching devices 122 is operated at approximately 10 kHz. Moreover, using the topologies and logic operations such as those disclosed herein, it is possible not only to use fewer switching devices 120, 122, but also to operate approximately 75% of the switching devices 120, 122 at significantly reduced switching frequencies without adversely affecting the AC output.

As shown in FIG. 8, the second set of gating signals 134 may be configured to enable each of the second set of switching devices 122 at a switching frequency that is equal to, or at least approximate to, the carrier frequency, or the frequency of the carrier signals 130. In addition, enabling the second set of switching devices 122 according to the second set of gating signals 134 of FIG. 8 may charge and discharge the corresponding flying capacitors 116 in a manner configured to generate phase signals 136 at the output nodes 118, as shown for example in FIG. 9. In particular, the phase signals 136 may be depicted in the form of, for example, line-to-line voltage signals 136-1, individual voltage signals 136-2, 136-3, or individual phase current signals 136-4, 136-5, 136-6. As demonstrated in FIG. 9, sinusoidal pulse width modulation of DC voltages may be used to generate phase signals 136 which sufficiently simulate the desired AC output signals.

As an additional feature, the controller 108 may also be configured to selectively enable one of a number of different modulation modes based on the type of load 106 and/or any changes in the load characteristics. Based on the logic circuit of FIG. 6, for example, the controller 108 may be configured to implement a first modulation mode that is optimized for purely reactive loads, where the power factor is approximately zero and the charge of the flying capacitors 116 are naturally balanced. However, for other load types or applications, alternative modulation modes may similarly be applied by the controller 108. For example, in applications where the power factor is non-zero, real power transfer is desired, and the charge of the flying capacitors 116 is not naturally balanced, the controller 108 may implement a second modulation mode as shown by the controller 108-1 in FIG. 10, or a third modulation mode as shown by the controller 108-2 in FIG. 11. Other modulation modes may additionally be available or designed for use with the topologies presented herein and will be apparent to those of ordinary skill in the art.

Figure 10:
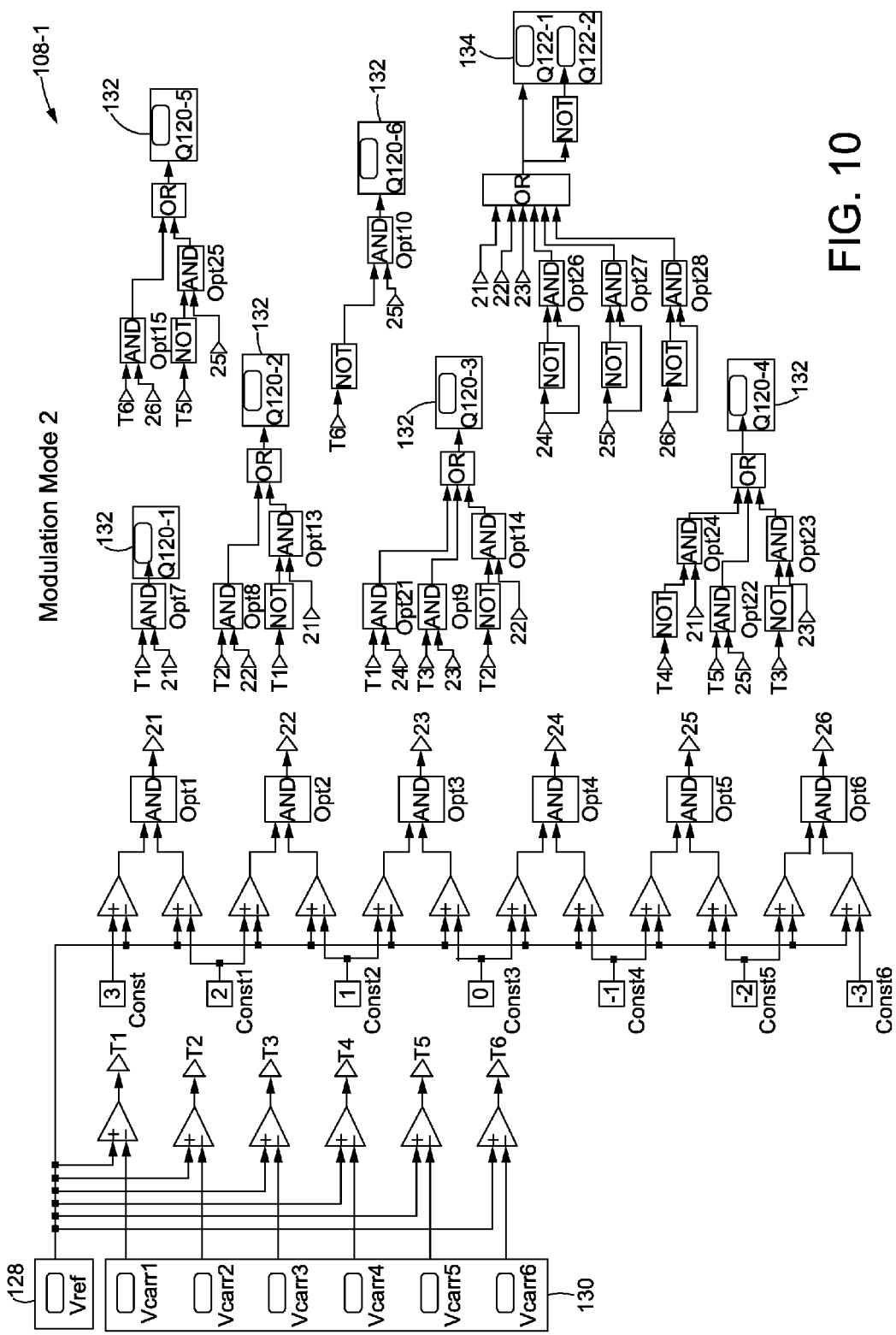
FIG. 10 is a schematic illustration of another controller for a multi-level converter configured to operate according to a second modulation mode.
Figure 11:
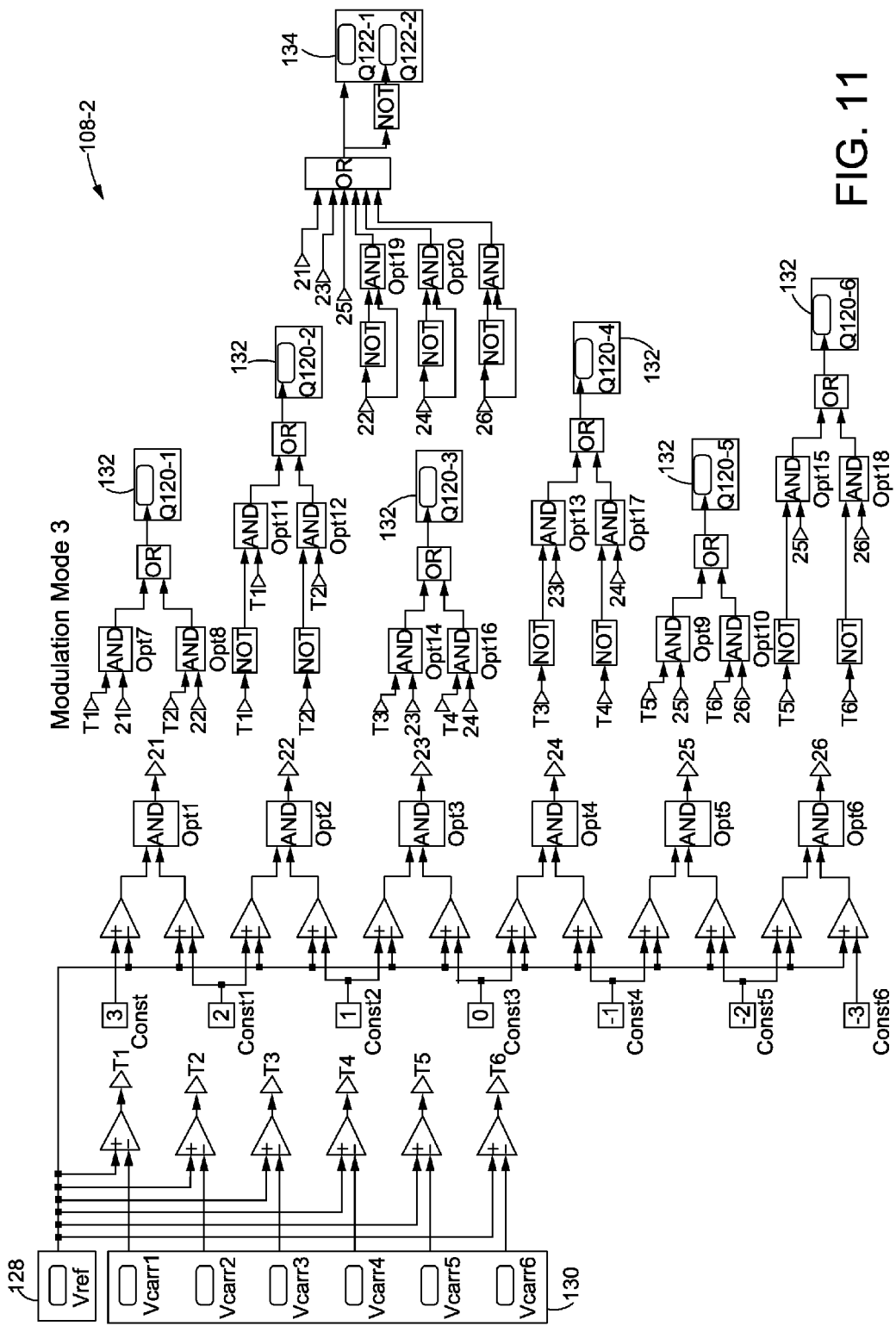
FIG. 11 is a schematic illustration of another controller for a multi-level converter configured to operate according to a third modulation mode.

In order to balance the flying capacitors 116 for non-zero power factors, or where real power is to be transferred, each of the second modulation mode of FIG. 10 and the third modulation mode of FIG. 11 may operate more of the first set of switching devices 120 at higher switching frequencies or for longer switching durations than the first modulation mode of FIG. 6. However, the second and third modulation modes may still be optimized so as to enable fewer switching operations per phase of the multi-level converter 102 as compared to conventional multi-level converters. Additionally, the controller 108 may be preprogrammed to dynamically swap between the first, second and third modulation modes based on detected changes in the load 106 or power characteristics thereof, such that the switching devices 120, 122 are not operated in any of the second and third modulation modes any more than is necessary to balance the flying capacitors 116. For example, the controller 108 may operate according to either the second or third modulation modes of FIGS. 10 and 11 only for as long as the power factor is non-zero, and immediately restore the first modulation mode as soon as the power factor returns to zero.

INDUSTRIAL APPLICABILITY

In general terms, the present disclosure sets forth topologies for multi-level converters and techniques for controlling same. Although applicable to any type of power system, the present disclosure may be particularly applicable to power systems for stationary or mobile industrial machines with high voltage loads, such as generator sets, solar panel systems, hybrid control systems or power grids, and the like. Moreover, the present disclosure provides simplified phase circuit topologies that are easily scalable to fit a variety of different load demands. Additionally, the present disclosure provides improved phase circuits for multi-level converters which employ fewer switches per phase and require fewer switching operations per phase to output appropriate AC phase signals to a connected load. By reducing the number of switches per phase and/or by reducing the number of switching operations performed per phase, the present disclosure is able to maintain lower operating temperatures and prolong the life of the multi-level converter. Furthermore, by reducing operating temperatures, the present disclosure reduces the need for more costly and complex cooling solutions.

Figure 12:
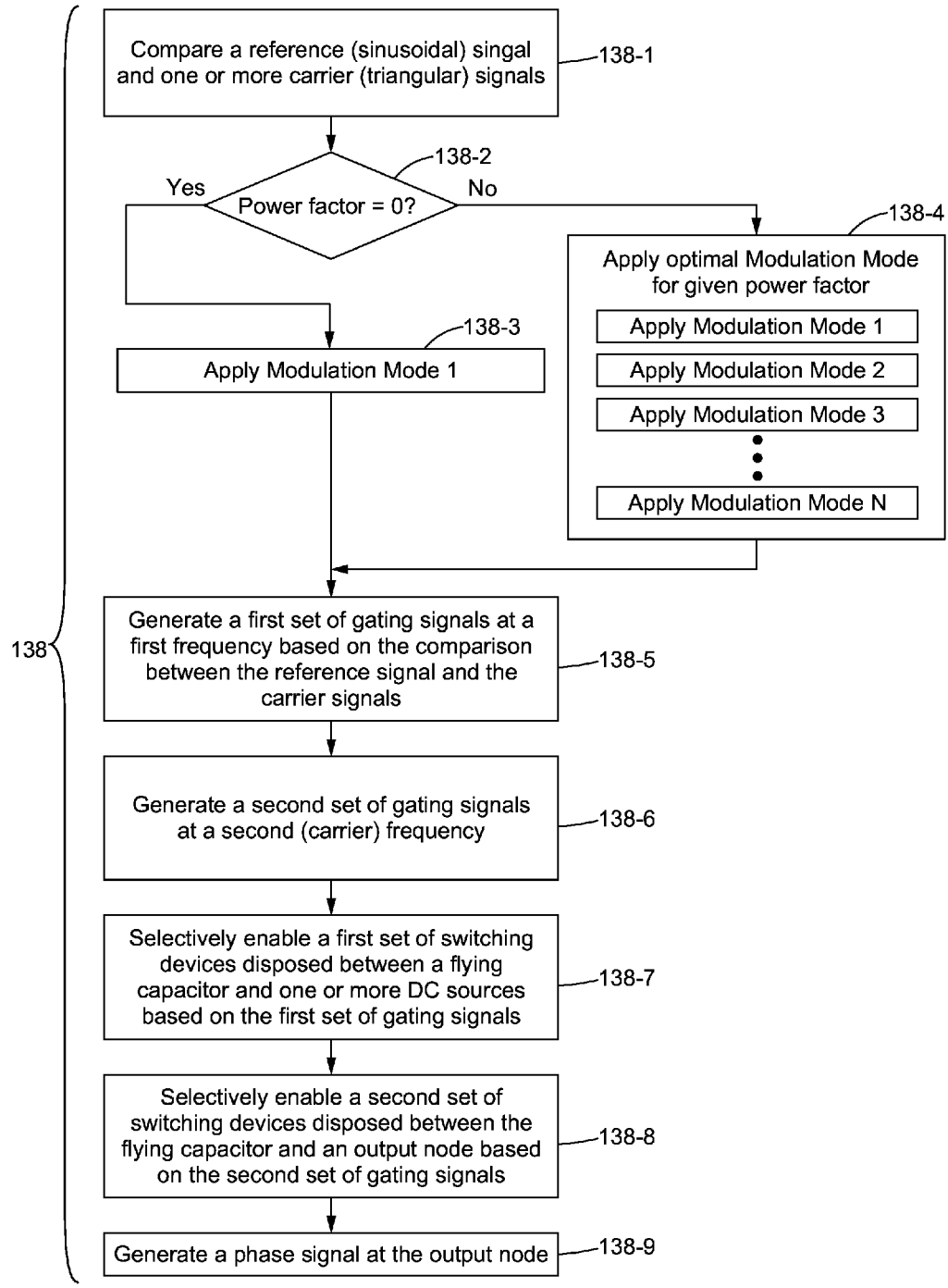
FIG. 12 is a flow diagram of an exemplary method or algorithm of the present disclosure.

One exemplary method 138 for controlling the multi-level converter 102 of FIG. 1 or operating the switching devices 120, 122 thereof is diagrammatically provided in FIG. 12. In particular, the method 138 may be implemented in the form of one or more algorithms, one or more logic operations as shown in FIG. 6, and the individual processes thereof may be performed by one or more of the controller 108 of FIG. 1, or the like. As shown in block 138-1, the method 138 may initially compare a reference signal 128 to each of the carrier signals 130. The reference signal 128 may be generated or provided as a sinusoidal waveform as shown in FIG. 8 and have a frequency at least approximate to that of the desired AC output or phase signal 136. The carrier signals 130 may include triangular waveforms each being tiered at distinct voltage tiers as shown in FIG. 7. For example, a seven-level converter 102 may include six triangular carrier signals 130 tiered into seven different voltage levels as shown in FIG. 7. By comparing the reference signal 128 to the carrier signals 130, the method 138 may be able to determine a sequence by which to enable each of the switching devices 120, 122 of the phase circuit 114.

If multiple switching sequences or modulation modes are available, the method 138 may optionally or additionally determine the appropriate modulation mode for the given load characteristics or power factor according to block 138-2 of FIG. 12. The power factor may be calculated based on a ratio between the real power and the apparent power that is transferred between the multi-level converter 102 and the connected load 106, and sensed based on current and/or voltage sensing devices commonly used in the art. If the power factor is determined to be zero, indicating purely reactive load characteristics where the flying capacitors 116 are naturally balanced, the default or first modulation mode, such as the modulation mode shown in FIG. 6, may be applied as shown in block 138-3 of FIG. 12. If, however, the power factor is non-zero, indicating load characteristics where real power transfer is desired, the second modulation mode of FIG. 10, the third modulation mode of FIG. 11, or any other appropriate modulation mode that may be available and a variation of those disclosed herein, may be applied according to block 138-4 of FIG. 12.

Based on the comparisons performed in block 138-1 and the modulation mode selected in blocks 138-3 and 138-4, the method 138 in block 138-5 may be able to generate a first set of gating signals 132 having reduced switching frequencies and collectively exhibiting fewer switching operations per switching device 120. According to block 138-6, the method 138 of FIG. 12 may additionally generate a second set of gating signals 134. Furthermore, when the power factor is zero, the second set of gating signals 134 may be generated using logical operations, such as via the first modulation mode of FIG. 6, to have switching frequencies which approximate the carrier frequency and are significantly greater than those of the first set of gating signals 132. When the power factor is not zero, the second set of gating signals 134 may also be generated at least partially using logical operations, such as those shown in FIGS. 10 and 11, or any other suitable process or technique, to have switching frequencies that are less than those of the first set of gating signals 132.

Furthermore, based on the first set of gating signals 132, the method 138 in block 138-7 of FIG. 12 may selectively enable the first set of switching devices 120, and thereby selectively couple one or more DC sources 110 of a DC link 112 to a flying capacitor 116, as shown for example in the multi-level converter 102 of FIG. 1. Similarly, based the second set of gating signals 134, the method 138 according to block 138-8 may selectively enable a second set of switching devices 122, such as those shown in FIG. 1, so as to selectively couple the flying capacitor 116 to the output node 118 of each phase circuit 114. For example, each of the first set of switching devices 120 of the multi-level converter 102 of FIG. 1 may be operated by a corresponding one of the first set of gating signals 132 shown in FIG. 8, while each of the second set of switching devices 122 may be operated by a corresponding one of the second set of gating signals 134 also shown in FIG. 8.

Figure 9:
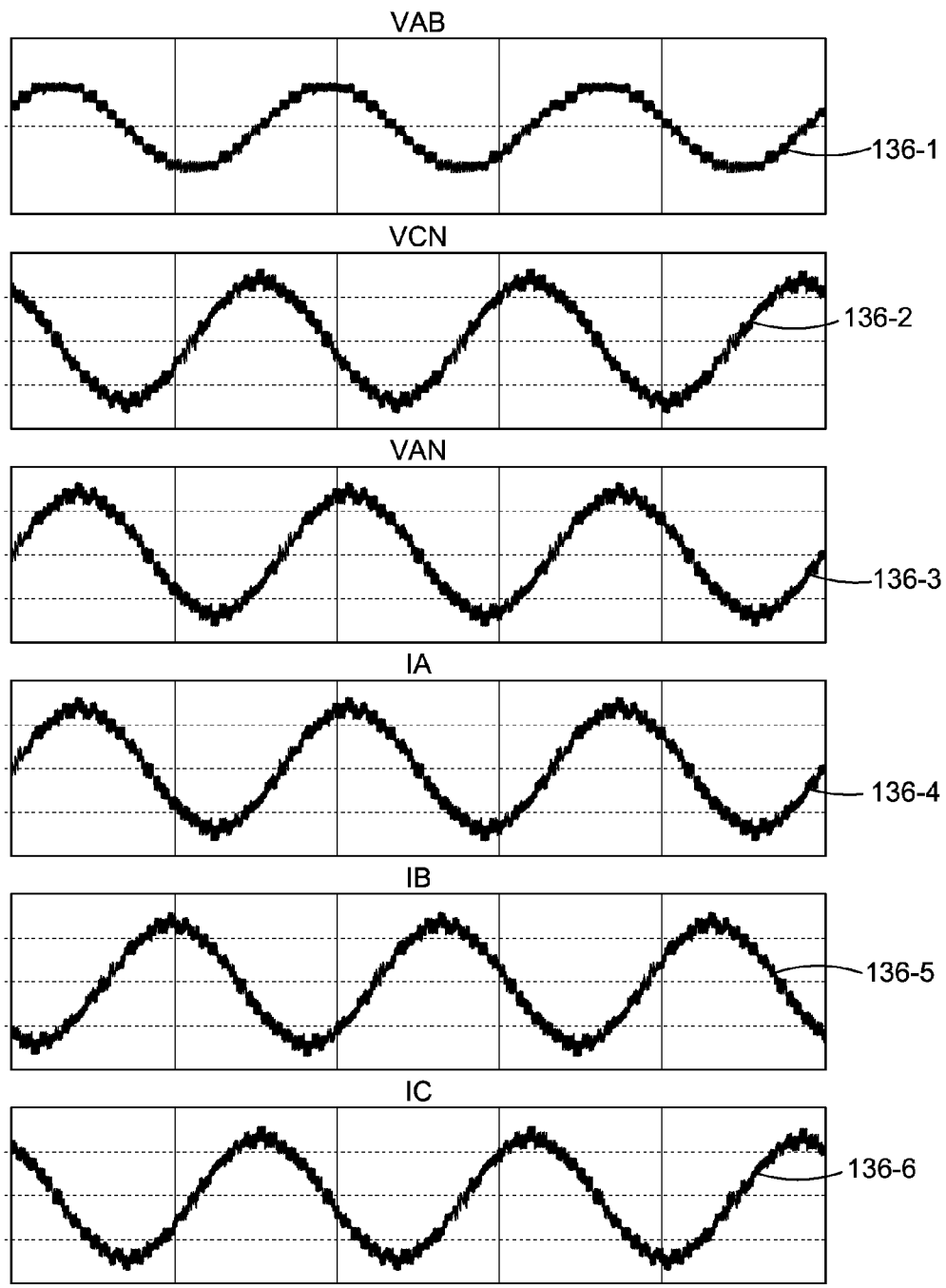
FIG. 9 is a graphical illustration of output phase signals.

By modulating the pulse width of different DC signals at different voltage tiers, and applying the carrier frequencies to the modulated signals, the method 138 according to block 138-9 of FIG. 12 may be able to generate an AC phase signal 136 at the output node 118 of each phase circuit 114. Furthermore, the method 138 of FIG. 12 may be reiteratively performed for each phase circuit 114 at predetermined intervals, and in a multiple phase application, the phase signal 136 from each phase circuit 114 may be phase-shifted by the appropriate offset. The phase signals 136 of the three-phase seven-level converter 102 of FIG. 1 for example may include line-to-line voltage signals 136-1, individual voltage signals 136-2, 136-3, or individual current signals 136-4, 136-5, 136-6, as shown in FIG. 9. As shown, sinusoidal pulse width modulation of DC voltages may be used to generate phase signals 136 which sufficiently simulate AC output signals that may be desired by an AC load 106. Still further, based on any changes detected in the load characteristics during block 138-2 for example, the method 138 may select among different available modulation modes to optimize charge balancing for the flying capacitors 116.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A multi-level converter, comprising:
   a plurality of direct current (DC) sources coupled in series to form a DC link; and
   at least one phase circuit coupled in parallel to the DC link, the phase circuit including at least one flying capacitor, at least one output node, a first set of switching devices selectively coupling the flying capacitor to one or more of the DC sources at a first frequency, and a second set of switching devices selectively coupling the flying capacitor to the output node at a second frequency, wherein the second frequency approximates a carrier frequency and is greater than the first frequency when power factor is zero.

2. The multi-level converter of claim 1, wherein the first set of switching devices includes at least a first switching device coupled to a positive terminal of the DC link, a second switching device coupled to a ground terminal of the DC link, and one or more intermediate switching devices disposed between the first switching device and the second switching device.

3. The multi-level converter of claim 2, wherein each of the first switching device, the second switching device and the second set of switching devices includes forward-blocking, bidirectionally-conducting switches, and each of the intermediate switching devices includes bidirectionally-blocking, bidirectionally-conducting switches.

4. The multi-level converter of claim 1, wherein an n-level converter is implemented by providing n−1 switching devices in the first set of switching devices, two switching devices in the second set of switching devices, and (n−1)/2 DC capacitors in the DC link, wherein n is the number of levels in the multi-level converter.

5. The multi-level converter of claim 1, wherein a seven-level three-phase converter is implemented by coupling the DC link in parallel to three phase circuits, each of the three phase circuits including four forward-blocking, bidirectionally-conducting switches and four bidirectionally-blocking, bidirectionally-conducting switches.

6. The multi-level converter of claim 1, wherein each of the first set of switching devices and the second set of switching devices is selectively enabled according to one of a plurality of different modulation modes, each modulation mode being optimized for balancing a charge of the flying capacitors for a given power factor.

7. A multi-level converter system, comprising:
   a plurality of direct current (DC) sources forming a DC link;
   at least one phase circuit coupled in parallel to the DC link, the phase circuit including at least one flying capacitor, at least one output node, a first set of switching devices disposed between the flying capacitor and one or more of the DC sources, and a second set of switching devices disposed between the flying capacitor and the output node; and
   a controller in electrical communication with at least each of the first set of switching devices and the second set of switching devices of the phase circuit, the controller being configured to selectively enable the first set of switching devices based on a first set of gating signals at a first frequency, selectively enable the second set of switching devices based on a second set of gating signals at a second frequency, and generate a phase signal at the output node, wherein the second frequency approximates a carrier frequency and is greater than the first frequency when power factor is zero.

8. The multi-level converter system of claim 7, wherein the controller is configured to generate the first set of gating signals based on comparisons between a reference signal and a plurality of carrier signals, the reference signal including a sinusoidal waveform and the carrier signals including triangular waveforms at distinct voltage tiers.

9. The multi-level converter system of claim 7, wherein the controller is configured to generate the second set of gating signals such that the second frequency approximates the carrier frequency.

10. The multi-level converter system of claim 7, wherein the controller is configured to enable the first set of switching devices and the second set of switching devices according to one of a plurality of different modulation modes, each modulation mode being optimized for balancing a charge of the flying capacitors for a given power factor.

11. The multi-level converter system of claim 7, wherein the first set of switching devices includes at least a first switching device coupled to a positive terminal of the DC link, a second switching device coupled to a ground terminal of the DC link, and one or more intermediate switching devices disposed between the first switching device and the second switching device.

12. The multi-level converter system of claim 11, wherein each of the first switching device, the second switching device and the second set of switching devices includes forward-blocking, bidirectionally-conducting switches, and each of the intermediate switching devices includes bidirectionally-blocking, bidirectionally-conducting switches.

13. The multi-level converter system of claim 7, wherein an n-level converter is implemented with n−1 switching devices in the first set of switching devices, two switching devices in the second set of switching devices, and (n−1)/2 DC capacitors in the DC link, wherein n is the number of levels in the multi-level converter.

14. A method of controlling a multi-level converter having a plurality of DC sources and at least one phase circuit having a flying capacitor and an output node, the method comprising:
   generating a first set of gating signals at a first frequency based on a reference signal and a plurality of carrier signals;
   generating a second set of gating signals at a second frequency;
   selectively enabling a first set of switching devices disposed between the flying capacitor and one or more of the DC sources based on the first set of gating signals;
   selectively enabling a second set of switching devices disposed between the flying capacitor and the output node based on the second set of gating signals; and
   generating a phase signal at the output node, wherein the second frequency approximates a carrier frequency and is greater than the first frequency when power factor is zero.

15. The method of claim 14, wherein the first set of gating signals is generated based on comparisons between the reference signal and the carrier signals, the reference signal including a sinusoidal waveform and the carrier signals including triangular waveforms at distinct voltage tiers, and wherein the second set of gating signals is generated such that the second frequency approximates the carrier frequency.

16. The method of claim 14, wherein the first set of switching devices includes at least a first switching device coupled to a positive terminal of the DC link, a second switching device coupled to a ground terminal of the DC link, and one or more intermediate switching devices disposed between the first switching device and the second switching device.

17. The method of claim 16, wherein each of the first switching device, the second switching device and the second set of switching devices includes forward-blocking, bidirectionally-conducting switches, and each of the intermediate switching devices includes bidirectionally-blocking, bidirectionally-conducting switches.

18. The method of claim 14, wherein the multi-level converter is an n-level converter having n−1 switching devices in the first set of switching devices, two switching devices in the second set of switching devices, and (n−1)/2 DC capacitors in the DC link, wherein n is the number of levels in the multi-level converter.

19. The method of claim 14, wherein each of the first set of switching devices and the second set of switching devices is selectively enabled according to one of a plurality of different modulation modes, each modulation mode being optimized for balancing a charge of the flying capacitors for a given power factor.

* * * * *